United States Patent [19]

Masao

[11] Patent Number: 4,522,676
[45] Date of Patent: Jun. 11, 1985

[54] APPARATUS FOR MANUFACTURING A ROOF LINING FOR AUTOMOBILES

[76] Inventor: Mikami Masao, 9-19, 1-chome Kogo-minami, Nishi-Ku, Hiroshima, Japan

[21] Appl. No.: 526,148

[22] Filed: Aug. 24, 1983

[30] Foreign Application Priority Data

Sep. 7, 1982 [JP] Japan .............................. 57-156454

[51] Int. Cl.³ .............................................. B31F 1/00
[52] U.S. Cl. .................................... 156/443; 156/204; 156/226; 156/227; 156/252; 156/459; 156/469; 156/474; 156/510; 156/513
[58] Field of Search ............... 156/510, 513, 459, 474, 156/204, 226, 227, 443, 469, 470, 196, 252, 253

[56] References Cited

U.S. PATENT DOCUMENTS

| | | | |
|---|---|---|---|
| 4,108,698 | 8/1978 | Brookshire | 156/65 |
| 4,199,394 | 4/1980 | Thompson | 156/474 |
| 4,227,952 | 10/1980 | Sabee | 156/474 |
| 4,244,966 | 1/1981 | Maloney | 156/196 |

Primary Examiner—Jay H. Woo
Assistant Examiner—Timothy W. Heitbrink
Attorney, Agent, or Firm—Koda and Androlia

[57] ABSTRACT

An apparatus for manufacturing a roof lining for automobiles includes a sheet feeding section, a loop forming section, a welding section, and a cutting section. From the sheet feeding section, a sheet made of thermoplastic material in a predetermined length is fed to the loop forming section wherein an U-shaped loop is formed on the sheet and a wire pocket is then automatically formed by the welding section so as to insert a resting wire therethrough. To facilitate inserting the resting wire, the wire pocket is partly cut off by actuating cutter arms in the cutting section.

8 Claims, 10 Drawing Figures

APPARATUS FOR MANUFACTURING A ROOF LINING FOR AUTOMOBILES

BACKGROUND OF THE INVENTION

1. Field of the Invention

The present invention relates to an apparatus for manufacturing a roof lining for automobiles and more particularly to an apparatus for manufacturing a roof lining made of thermoplastic material.

2. Prior Art

The inside of a roof of an automobile is usually lined with a roof lining made of cloth, polyvinylchloride sheet or the like material with an insulator interposed therebetween. There are two types of roof linings. One is formed such that sagging of the roof lining is prevented by means of a plurality of resting wires extending in the transverse direction. The other type of lining is formed in a composite structure consisting of a matrix of cardboard, felt-like material with plastic material impregnated therein or the like, and a lining layer of cloth or the like material both are thermally adhered to one another with an adhesive interposed therebetween with the aid of a hot press.

The present invention is of the first type roof lining which is constructed by a sheet made of thermoplastic material with a plurality of elongated wire pockets integrally formed on the sheet through which a resting wire is inserted.

The conventional roof lining is typically illustrated in FIGS. 9 and 10. As is apparent from the drawings, the wire pockets are formed with several different materials on the roof lining. The wire pockets are welded to the lining with thermal energy generated by high frequency current.

Normally, the welding with high frequency current is manually carried out for each of the welding spots on the wire pockets. An improved apparatus, semi-automatic welding apparatus, can be employed too. The apparatus works such that when a sheet material is placed around the periphery of a drum, the drum rotates at a certain angle. When the drum stops, another sheet material is manually placed thereon. Welding is then carried out for thermally adhering the sheet materials to one another with high frequency current. Such steps are repeated for several times to form the wire pockets.

However, it is found that the manual or semi-automatic type of apparatus for manufacturing a roof lining as described above has low productivity, fluctuation in quality, high rate of material consumption with high manufacturing cost. As a result, it fails to meet the needs of manufacturers whose business activities cannot last any longer unless high productivity improved quality and reduced manufacturing costs are assured.

SUMMARY OF THE INVENTION

Therefore it is an object of the present invention to provide an improved apparatus for manufacturing a roof lining for automobiles which automatically achieves the lining manufacturing steps with remarkably high productivity.

It is other object of the present invention to provide an apparatus for manufacturing a roof lining for automobiles wherein the manufacturing process is automatically practiced under constant working conditions at all times, preventing fluctuation in quality and occurance of inferior products.

It is another object of the present invention to provide an apparatus for manufacturing a roof lining for automobiles in which the wire pockets, the most important parts in the roof lining, are automatically formed in a shorter period of time with high quality and few occurance of inferior products.

It is still another object of the present invention to provide an apparatus for manufacturing a roof lining for automobiles which assures an improved efficiency, reduction of manpowers, few material consumption and reduced manufacturing costs.

The above objects are accomplished by a unique apparatus for manufacturing a roof lining for automobiles that performs the steps of: feeding forward a sheet of thermoplastic material which is cut into a predetermined length corresponding to the roof length of a single automobile and an additional length for forming a plurality of wire pockets; stopping the feed of the sheet at the position where a wire pocket is to be formed; depressing downward a portion on the sheet within a slit formed on a table by lowering a depressing tool until a U-shaped loop is formed for the overall width of the sheet; forming a cylindrical wire pocket having a length equal to the width of the sheet by thrusting the upper parts of the U-shaped loop against an anvil plate by means of a welding bar; welding the upper part of the loop by thermal energy generated by high frequency current; and, forming cutouts on the wire pocket at its center and/or both ends by smashing the wire pocket against the anvil plate by cutting edges. The apparatus repeats the above steps for the required number of wire pockets to be formed.

In a preferred embodiment of the present invention, the apparatus includes a sheet feeding section. The sheet has engagement holes formed at both sides of the front edge. Engagement pins on an elongated holding rod is inserted into the holes of the sheet. The holding rod is connected to a pair of driving endless chains circulating in parallel on the side edges of a table. A retaining rod is placed on the holding rod to firmly clamp the sheet therebetween, whereby the sheet is fed forward on the table to the position where a wire pocket is to be formed, and it is then caused to stop temporarily.

Further, the apparatus of the invention includes a sheet stretching system including a number of air suction holes through which the air is sucked downward under reduced pressure produced in the space below the table so that the sheet is thrusted on the upper surface of the table and is stretched when it is fed forward.

Further, the apparatus of the present invention includes a loop forming section where an U-shaped loop is formed by a depressing tool having a length equal to or substantially equal to the width of the sheet. The depressing tool is lowered by a combination of raising and lowering guides to form the U-shaped configuration on the sheet. The raising and lowering cylinder is secured to the center of the depressing tool, and the raising and lowering guides are secured to near the side ends of the depressing tool.

Further, the apparatus of the invention includes a welding section by which a wire pocket is formed by welding the upper parts of the U-shaped loop together by a welding bar having a length equal to or substantially equal to the width of the sheet. The welding bar is adapted to thrust the U-shaped loop against an anvil plate with the aid of a combination of a reciprocable cylinder and a pair of reciprocable guides. The reciprocable cylinder is fixedly secured to the center of the welding bar and extends below the table in parallel to the table. The reciprocable guides are secured near the both side ends of the welding bar.

Further, the apparatus of the invention includes a cutting section which forms cutouts by smashing the wire pocket against the anvil plate with a plurality of cutter arms. A cutting edge is attached to the front face of the cutter arm which are disposed at the position where the cutouts are formed on the wire pockets. The rotary shaft of the cutter arm locates under the U-shaped loop and extends in the transverse direction whereby cutting is carried out by the cutter arms adapted to be power rotated.

Other objects, features and advantages of the invention will become apparent from the following description made in conjunction with the accompanying drawings.

DETAILED DESCRIPTION OF THE INVENTION

The present invention will be described in detail with reference to the accompanying drawings illustrating an preferred embodiment.

Prior to operating the apparatus, a sheet 1 made of thermoplastic material such as polyvinylchloride or the like is cut into a predetermined length corresponding to the length of a roof of a single automobile and an additional length required for forming a plurality of wire pockets.

Figure 7:
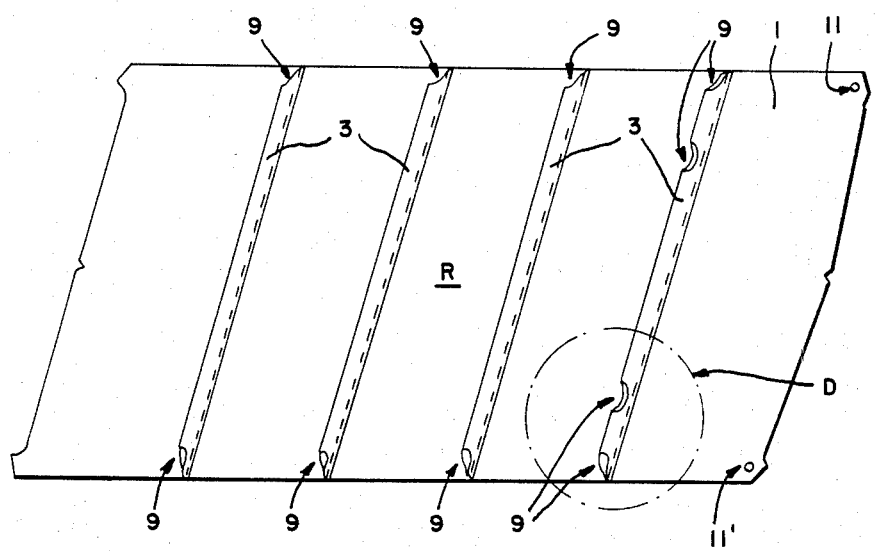
FIG. 7 is a perspective view of the finished roof lining according to the invention.
Figure 8:
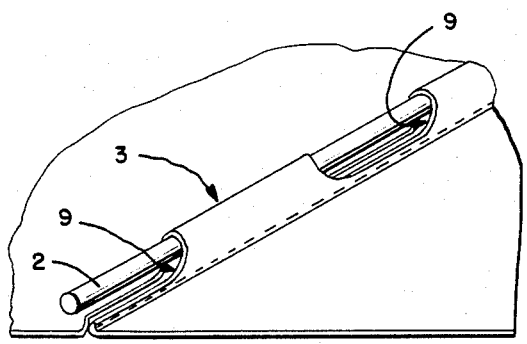
FIG. 8 is an enlarged perspective view of the portion D in FIG. 7, illustrating a resting wire inserted through the wire pocket.
Figure 9:
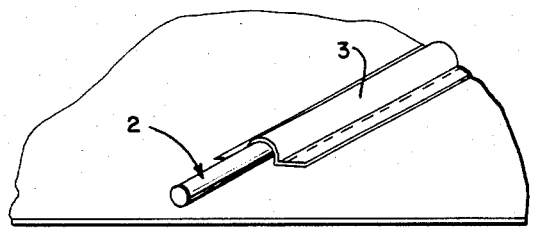
FIGS. 9 and 10 are enlarged perspective views illustrating a part of the conventional roof lining.
Figure 10:
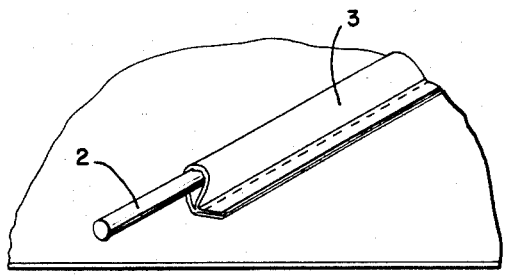

As seen from FIG. 7, the sheet 1 has a pair of engagement holes 11 and 11' at botn sides of the leading edge. The holes 11 and 11' are intended to assure correct positioning of the sheet 1 on a table 4. In positioning the sheet 1, engagement pins 14 on a holding rod 13 are first inserted into the engagement holes 11 and 11'. The holding rod 13 is connected to a pair of driving endless chains 12 and 12' at its both ends which are extended in parallel to the side edges of the table 4. Then, the leading edge of the sheet 1 is firmly clamped between the holding rod 13 and a retaining rod 15. When the positioning of the sheet 1 is completed, driving sprockets 16 are rotated by a driving power source (not shown) so that the endless chains 12 and 12' circulate together with the sheet 1. To prevent the sheet 1 from being loosened during the forward movement, a number of air suction holes 17, each having a small diameter, are formed on the table 4 so as to thrust the sheet 1 on the upper surface of the table 4 with the reduced pressure generated by air suction through the holes 17. Thus, the sheet 1 is caused to be fed with a certain resistance accompanied against the movement thereof.

When the first wire pocket forming portion on the sheet 1 comes above an U-shaped loop forming section, it is detected by a detecting switch (not shown) and the endless chains 12 and 12' stop the circulation.

Figure 1:
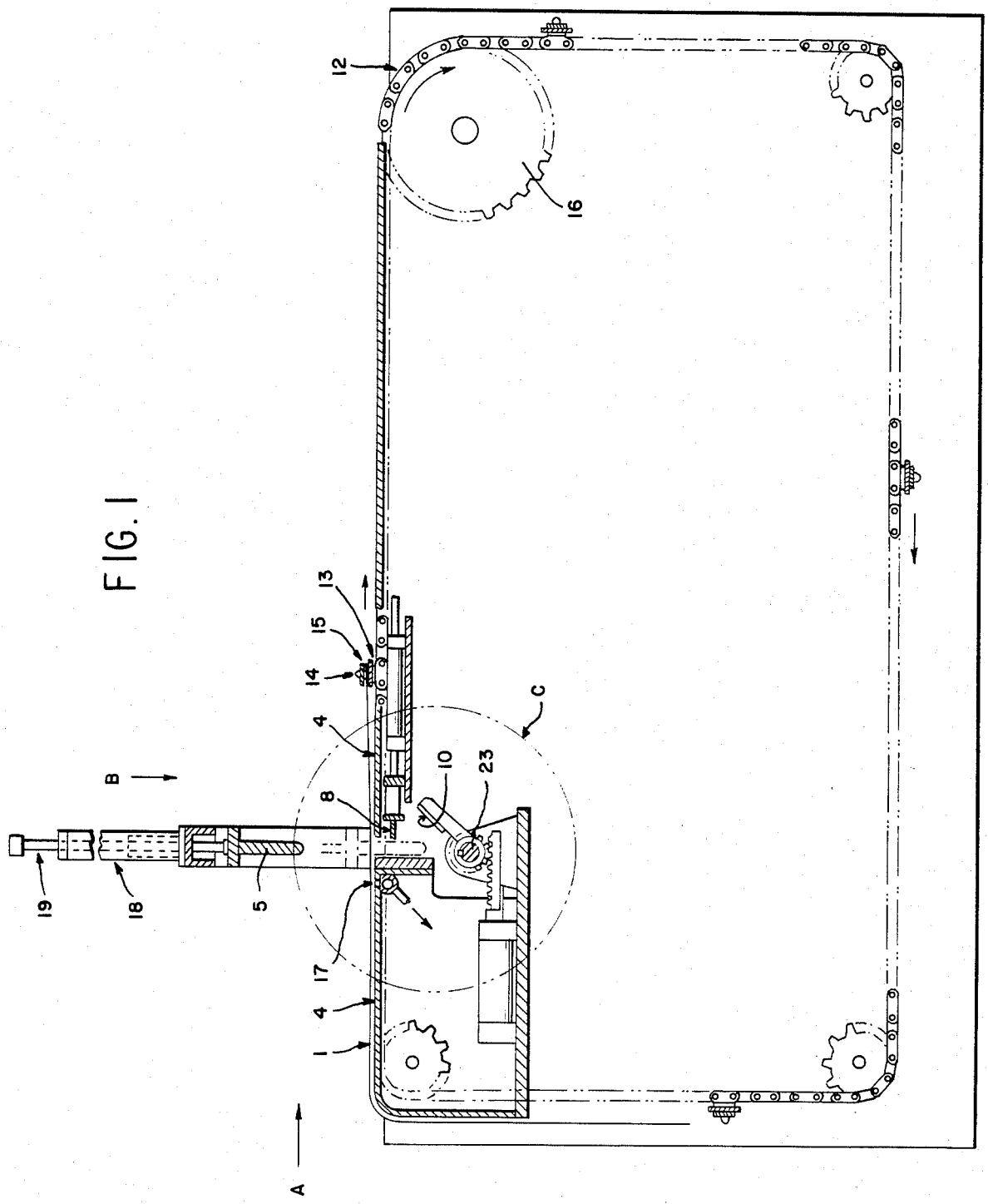
FIG. 1 is a vertical, sectional side view of an apparatus in accordance with the present invention.
Figure 2:
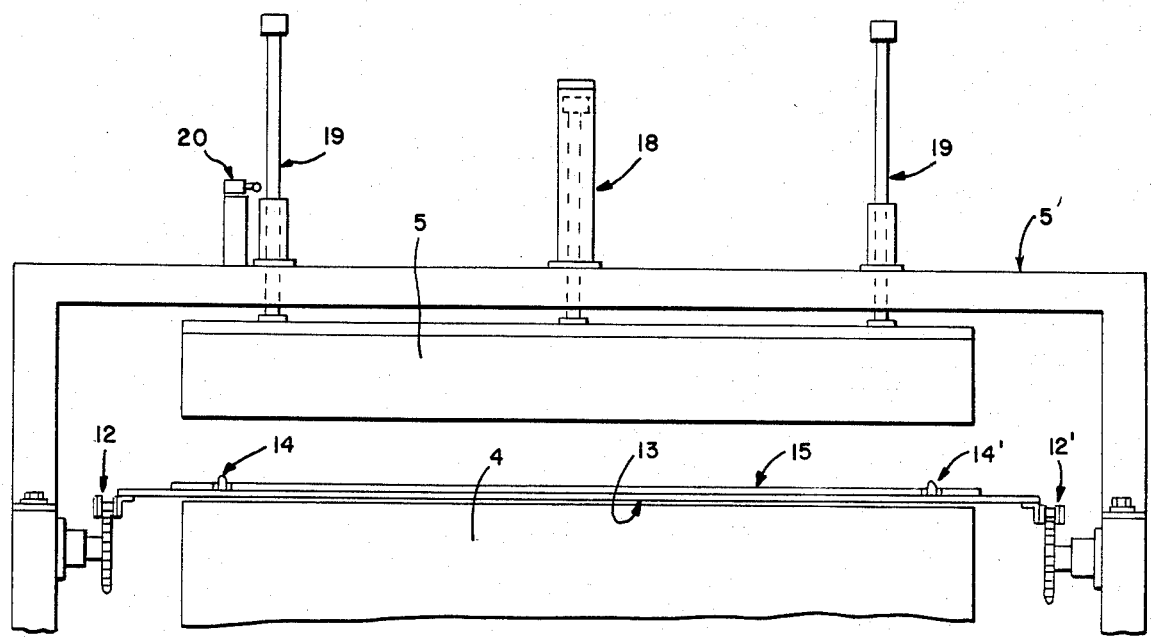
FIG. 2 is a partial front view of the apparatus as seen in the direction of the arrow A in FIG. 1.
Figure 3:
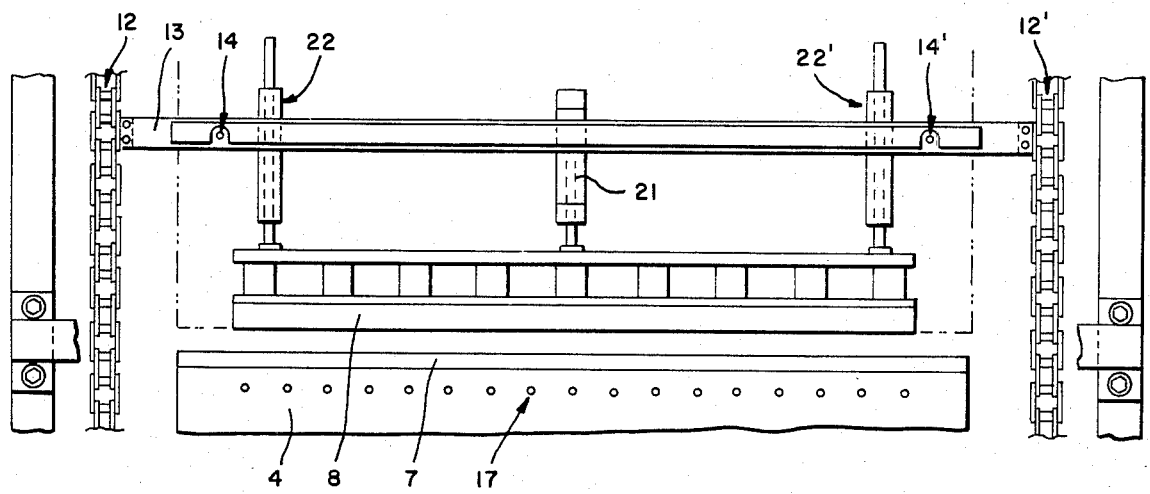
FIG. 3 is a partial plan view of the apparatus with a part of a table removed as seen in the direction of the arrow B in FIG. 1.
Figure 4:
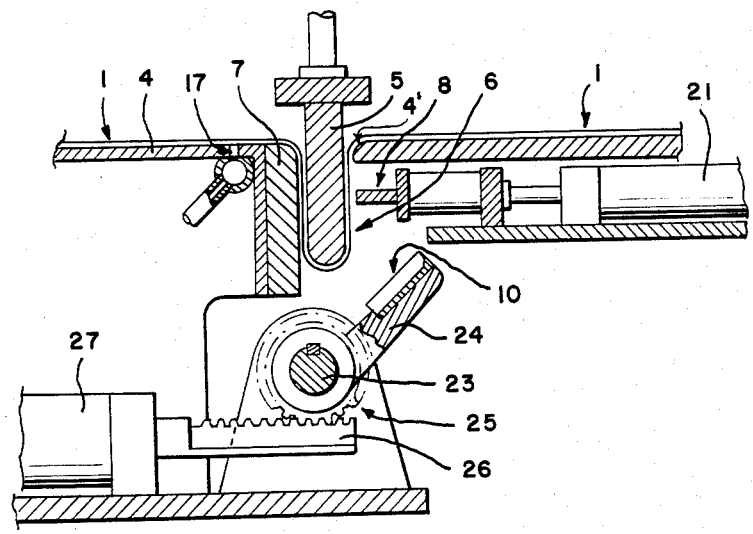
FIG. 4 corresponding to the portion C in FIG. 1, illustrates a sheet being deformed into an U-shaped loop.

As illustrated in FIG. 2, the loop forming section is designed such that a depressing plate 5 (which may be replaced with a depressing tool having round section) having a length equal to or substantially equal to the width of the sheet 1 moves up and down by a combination of raising and lowering cylinder 18 and a pair of guide poles 19 and 19'. The raising and lowering cylinder 18 is mounted on a reversed U-shaped frame 5' bridged across the table 4 in the transverse direction. The guide poles 19 and 19' are mounted at both ends of the frame 5'. When the sheet 1 is stopped, the depressing plate 5 is lowered until a U-shaped sagging loop 6 is formed within a slit 4' which extends across the table 4 in the transverse direction, as illustrated in FIG. 4.

At this moment, the lowest position of the depressing plate 5 is detected by detecting the working stroke of the guide poles 19 and 19' by a limit switch 20. The raising and lowering cylinder 19 is then caused to operate in the opposite direction so that the depressing plate 5 is raised to the initial uppermost position.

Figure 5:
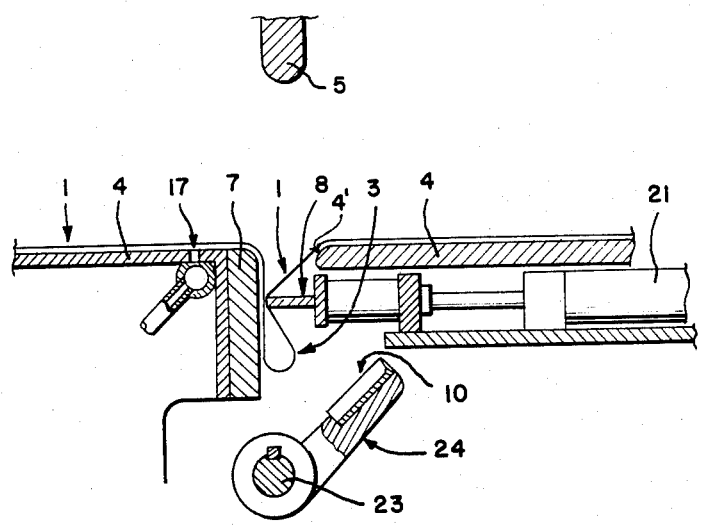
FIG. 5 illustrates the upper parts of the U-shaped loop being welded together.

After the U-shaped loop 6 is formed, a welding section works as illustrated in FIG. 5. Specifically, the welding section includes a welding bar 8 and reciprocable cylinder 21 located below the table 4. The welding bar 8 has a length equal to or substantially equal to the width of the sheet 1. The reciprocable cylinder 21 includes an actuating rod, of which foremost end is fixedly secured to the welding bar 8 at a right angle. The welding section further includes a pair of reciprocable guides 22 and 22' extending in parallel to the reciprocable cylinder 21. The guides 22 and 22' are disposed at approximately both ends of the welding bar 8. Thus, the welding bar 8 moves in the horizontal direction toward an anvil plate 7, which is made of aluminum alloy and located to face the welding bar 8, by means of the reciprocable cylinder until the upper part of the U-shaped loop 6 is welded together by the welding bar 8 pushing the loop 6 against the anvil plate 7 and thereby a wire pocket 3 is formed which extends across the full width of the sheet 1.

On completion of welding operation, the reciprocable cylinder 21 causes the welding bar 8 to return to the initial position.

Figure 6:
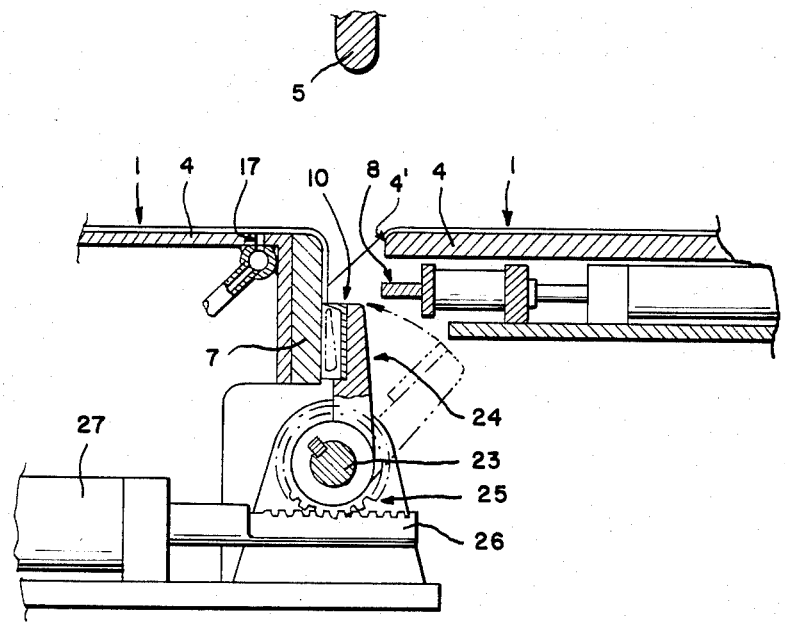
FIG. 6 illustrates the manner forming a cutout on a wire pocket.

Next, to form local cutouts 9 at the central and both end parts of the wire pocket 3 for facilitating insertion of a resting wire 2, insulator and the like material, cutter arms 24 are rotated from the dotted line position to substantially vertical position as shown in FIG. 6. Shaft 23 of the cutter arms 24 is located under the U-shape loop 6. Cutting process by the required number of the cutter arms 24 having cutting edges 10 on its one side at the predetermined positions is carried out in the following manner: The cutter arms 24 rotates in the direction shown by an arrow with the aid of rack and pinion mechanism. This mechanism includes a pinion 25 mounted on the shaft 23 of the cutter arms 24 and a rack 26 actuated by a cylinder rack 27. The cutting edges 10 on the cutter arms 24 hits the loop 6 against the anvil plate 7 to cut out the corresponding positions on the pocket. The cutter arms 24 then rotates back to the oridinal position shown by the dotted lines.

On completion of forming the cutouts 9, the first wire pocket 3 is obtained. Next operation for forming pockets and cutouts will be made in the same manner.

Namely, the endless chains 12 and 12' are driven and a portion for second wire pocket on the sheet 1 is brought under the depressing plate 5. At this moment, the chains stop feeding the sheet 1 so that the steps of loop forming, welding, and cutting are carried out in the same manner as in the foregoing. The above steps are repeated until a roof lining R is formed as illustrated in FIG. 7.

It should be noted that the welding bar 8 and the cutter arms 24 are actuated in such a manner that when the welding bar 8 moves toward the anvil plate 7 as illustrated in FIG. 5, the cutter arms 24 are located at the inoperative position. When the cutter arms 24 rotates as illustrated in FIG. 6, the welding bar 8 is held in the retracted state. As a result, movements of the welding bar 8 and the cutter arms 24 do not interfere each other.

In the apparatus of the invention, a preset of the sheet 1 to cut it in the predetermined length and a removal of the finished roof lining R may be done by manual operation. Alternatively, such preset and removing may be carried out by the conventional automatic sheet feeding mechanism and a automatic product removing mechanism.

To carry out a series of operations of the apparatus automatically as described above, existing sequence control system including detecting sensors such as limit switch or the like for detecting the movement and displacement of the components in the apparatus should be preferably employed.

As will be apparent from the above description, roof linings for automobiles are automatically manufactured at high efficiency under constant working conditions. Thus, the products, roof linings, of the identical size and improved equality are obtained without any failure or high skilled laborers. Further, the roof linings are manufactured under the high productivity with lower cost.

While the invention is shown and described only with reference to a preferred embodiment thereof, it will be obvious to those skilled in the art that various changes and modifications may be made therein without any departure from the scope of the invention as defined by the following claims.

I claim:

1. An apparatus for manufacturing a roof lining for automobiles comprising:
   a sheet feeding section comprising a means for feeding forward a sheet of a predetermined length required for a single roof lining made of thermoplastic material on a table and for causinng the feeding of the sheet to temporarily stop where a wire pocket is formed through which a resting wire is inserted later and a means for firmly holding a leading edge of said sheet after said sheet is fed forward;
   a loop forming section comprising a vertically movable depressing tool which is disposed above the table and has substantially the same width as the table, said loop forming section lowering said depressing tool through a slip formed on the table onto the sheet to form a U-shaped loop;
   a welding section disposed below the table, said welding section comprising a welding bar and an anvil plate located opposite to said welding bar, said welding section forming a cylindrical wire pocket extending across the width of the sheet by thrusting the upper part of the U-shaped loop against said anvil plate by said welding bar to weld it together using thermal energy generated by high frequency current or the like; and
   a cutting section including cutting edges for forming cutouts at both the end parts of the wire pocket and at the central part of the wire pocket as required, said cutting section practicing cutting operation by crashing the wire pocket against the anvil plate by means of said cutting edges.

2. An apparatus as defined in claim 1, wherein the sheet has engagement holes formed at both sides of the leading edge through which an engagement pin formed on an elongated holding rod is inserted, said holding rod being connected to a pair of driving endless chains provided in parallel on the side edges of the table, and a retaining rod is placed on the holding rod with the sheet firmly clamped therebetween.

3. An apparatus as defined in claim 1, further comprising a sheet stretching system, said system comprising a number of air suction holes through which air is sucked downward under reduced pressure produced in the space under the table so that the sheet being fed forward is thrusted on the upper surface of the table to be stretched.

4. An apparatus as defined in claim 1, wherein said depressing tool having a length equal to or substantially equal to the width of the sheet and extending above the table in the transverse direction in the loop forming section is vertically displaced by a combination of a raising and lowering cylinder and a pair of raising and lowering guide to form the U-shaped loop on the sheet, said raising and lowering cylinder being fixedly mounted on the center of an inverted U-shaped frame and said raising and lowering guides being fixedly mounted near the both sides of the frame, and a detecting switch is provided so as to detect the working stroke of the depressing tool.

5. An apparatus as defined in claim 1, wherein the welding bar having a length, equal to or substantially equal to the width of the sheet and extending below the table in the transverse direction in the welding section is horizontally displaced by a combination of a reciprocable cylinder and a pair of reciprocable guides, said reciprocable cylinder being fixedly secured at the center of the welding bar at a right angle and extending in parallel to the table, and said reciprocable guides being fixedly secured near the both ends of the welding bar and extending in parallel to the reciprocable cylinder.

6. An apparatus as defined in claim 1, wherein the cutting section comprises a plurality of cutter arms having a cutting edge attached thereto which are disposed at the position corresponding to the cutouts to be formed on the wire pocket and the rotary shaft of the cutting arms is located below the U-shaped loop and extends in the transverse direction whereby cutting operation is carried out by thrusting the wire pocket against the anvil plate by means of said cutter arms adapted to be power rotated.

7. An apparatus as defined in claim 4, said depressing tool is in a plate shape.

8. An apparatus as defined in claim 4, said depressing tool is in a rod shape.

* * * * *